United States Patent
Unterweger et al.

(10) Patent No.: US 12,006,680 B2
(45) Date of Patent: Jun. 11, 2024

(54) ANCHOR CHANNEL AND COMBINATION OF ANCHOR CHANNEL AND HAMMERHEAD ELEMENT

(71) Applicant: fischerwerke GmbH & Co. KG, Waldachtal (DE)

(72) Inventors: Roland Unterweger, Freudenstadt (DE); Falk Wittmann, Böhlen (DE); Christoph Wiedner, Feldkirch (AT)

(73) Assignee: FISCHERWERKE GMBH & CO. KG, Waldachtal (DE)

( * ) Notice: Subject to any disclaimer, the term of this patent is extended or adjusted under 35 U.S.C. 154(b) by 0 days.

(21) Appl. No.: 17/924,992

(22) PCT Filed: May 3, 2021

(86) PCT No.: PCT/EP2021/061501
§ 371 (c)(1),
(2) Date: Nov. 12, 2022

(87) PCT Pub. No.: WO2021/239393
PCT Pub. Date: Dec. 2, 2021

(65) Prior Publication Data
US 2023/0183965 A1 Jun. 15, 2023

(30) Foreign Application Priority Data

May 25, 2020 (DE) .................. 10 2020 113 880.6
Dec. 7, 2020 (DE) .................. 10 2020 132 424.3

(51) Int. Cl.
*E04B 1/41* (2006.01)

(52) U.S. Cl.
CPC ................ *E04B 1/4107* (2013.01)

(58) Field of Classification Search
CPC ...... E04B 1/4107; F16B 35/06; F16B 37/045; B60P 7/0815; F16L 3/2431
See application file for complete search history.

(56) References Cited

U.S. PATENT DOCUMENTS

| | | | | |
|---|---|---|---|---|
| 4,695,019 A | * | 9/1987 | Lindberg | F16L 3/243 248/62 |
| 4,950,099 A | * | 8/1990 | Roellin | B62D 33/044 403/348 |

(Continued)

FOREIGN PATENT DOCUMENTS

| | | |
|---|---|---|
| DE | 1869143 U | 3/1963 |
| DE | 7412824 U | 8/1974 |

(Continued)

OTHER PUBLICATIONS

International Preliminary Report on Patentabiity for corresponding Application No. PCT/EP2021/-61501 issued on Nov. 17, 2022, with English translation.

(Continued)

*Primary Examiner* — Theodore V Adamos
(74) *Attorney, Agent, or Firm* — Renner, Otto, Boisselle & Sklar, LLP

(57) ABSTRACT

An anchor channel of C-shaped cross-section for embedding in concrete, wherein a lip which adjoins the slot-like opening has been reinforced. In order to achieve high holding forces against withdrawal of a hammerhead element, a setting angle assumes a maximum value in a region that is located closer to the side wall than to the opening.

13 Claims, 3 Drawing Sheets

(56) References Cited

U.S. PATENT DOCUMENTS

| | | | | |
|---|---|---|---|---|
| 5,165,628 | A * | 11/1992 | Todd | F16B 37/045 |
| | | | | 248/62 |
| 6,827,531 | B2 * | 12/2004 | Womack | B60P 7/0815 |
| | | | | 410/104 |
| 10,604,057 | B2 * | 3/2020 | Gettel | B60P 7/0815 |
| 2020/0309184 | A1 * | 10/2020 | Schuit | F24S 25/30 |

FOREIGN PATENT DOCUMENTS

| | | | | |
|---|---|---|---|---|
| DE | 29 23 070 | A1 | 12/1980 | |
| EP | 2907932 | A1 | 8/2015 | |
| EP | 3081707 | A1 * | 10/2016 | ........... E04B 1/4107 |
| EP | 3 643 846 | A1 | 4/2020 | |
| EP | 3812525 | A1 * | 4/2021 | ........... E04B 1/4107 |

OTHER PUBLICATIONS

International Search Report for corresponding Application No. PCT/EP2021/061501, mailed Jul. 8, 2021.
Written Opinion for corresponding Application No. PCT/EP2021/061501, mailed Jul. 8, 2021.
German Search Report for corresponding Application No. 10 2020 113 881.4, dated Apr. 15, 2021.

* cited by examiner

ANCHOR CHANNEL AND COMBINATION OF ANCHOR CHANNEL AND HAMMERHEAD ELEMENT

TECHNICAL FIELD

The invention relates to an anchor channel and to a combination of anchor channel and hammerhead element with enhanced load-bearing capacity.

DISCUSSION OF THE RELATED ART

For fastening objects to a structural member made of concrete, anchor channels are known which are embedded in concrete. The anchor channels typically have a rail with anchor bolts fastened thereto. Prior to the concreting, the anchor channels are nailed or screwed to the formwork by a side of the rail referred to hereinbelow as the "upper side", so that only the upper side is accessible once the concrete has hardened. Hereinbelow the directional information "up" and "down" and terms such as "upper side" and "underside" are always used as appropriate to how the rail is mounted in the base. Accordingly, when the rail is mounted on a ceiling, the upper side of the rail points downwards. The upper side has a slot-like opening, so that a hammerhead element can be inserted and anchored by rotation through, for example, 90°. A "hammerhead element" is to be understood herein as including hammerhead screws, hammerhead bolts and hammerhead nuts. Lips extend from sides walls of the rail as far as the opening, behind which lips the hammerhead element engages. On an underside that is located opposite the upper side, the rails typically have downwardly projecting anchor bolts, an "anchor bolt" being understood herein to include both the widely used rotationally symmetrical bolts and special forms having the same function, such as sheet metal strips, wires or the like. The anchor bolts have the function of conducting forces that are exerted on the rail, for example by a hammerhead screw, from the rail to the surrounding concrete. Anchor channels without anchor bolts also exist, however. In particular, such anchor channels, like mounting rails, are also used for fastening without being embedded in concrete.

In respect of the load-bearing capacity of such anchor channels, the lips have proved to be a potential point of weakness. Lips having uniform thickness are known from the prior art, as are also, however, lips that increase in thickness in the direction of the opening, for example as known from DE19740112824U. Bent-over lips are also known, for example from the publication DE1963D026172U. The bending-over can also be thought of as a thickening of the lip immediately at the opening.

The problem of the invention is to propose an anchor channel and a combination of anchor channel and hammerhead element having enhanced load-bearing capacity.

SUMMARY OF THE INVENTION

The invention proposes an anchor channel, especially for embedding in concrete, having a rail. The rail has a cross-section having a substantially constant, C-shaped profile. The rail is especially produced from a sheet metal strip by roll-forming. "C-shaped" herein especially also includes angular profiles. The profile extends along a longitudinal direction, the profile having an inner side and an outer side as well as an, especially substantially rectangular, outline. The corners of the profile are especially rounded. The profile has an underside and an upper side, which is located opposite the underside, as well as two connecting sides which connect the upper side and the underside. In addition to substantially rectangular outlines, also included are especially outlines where the underside tapers towards the bottom, for example in order to accommodate a head of an anchor bolt.

On the upper side of the rail, an opening of the C-shaped profile extends in a longitudinal direction. The opening can also be thought of as a slot. The opening serves especially for the insertion of a hammerhead element.

On the underside of the rail there are arranged especially a plurality of anchor bolts, but it is also possible for the rail to have no anchor bolts at all.

The connecting sides are formed by side walls of the rail. The side walls are especially planar and especially have a substantially uniform thickness.

The interior of the rail can be sealed or can be filled with a resilient material, such as foam, in order to prevent the influx of concrete. Once the concrete has hardened, the seal or filling can be removed.

On the upper side, lips extend from each of the side walls as far as the opening. The lips especially serve for being engaged behind by a hammerhead element. In other words, the lips form contact faces on the inner side for the transmission of forces between the rail and a fastening element that is inserted into the rail.

The thickness of the lips in each case widens in the direction towards the opening, the inner side and the outer side being at a setting angle with respect to one another. "In the direction towards the opening" always means the direction from the connecting side to the opening. The setting angle is therefore the angle between the inner and outer sides in the region in which the lip widens in the direction towards the opening. The value of the setting angle is especially not constant over the entire region in which the lip widens in the direction towards the opening, but changes, it being possible for it to be constant over some portions or to change continuously. It should be noted that herein the concept of the "setting angle" is used only for the region in which the thickness of the lip widens, that is to say in a widening region of the lip.

The lips are especially planar on the upward-facing outer side and run especially at a right-angle with respect to the connecting sides. Both for production-related reasons and for forming toothing or the like, the outer side can also be non-planar. In that case the thickness and also the setting angle relate to a notional plane spanning the lip on the outer side.

In the event of the lip's having toothing, the thickness relates to the envelope contour, because that is determinative of the stability, that is to say it does not relate, for example, to the contour in the tooth base. In particular, the thickness at a specific location along the direction towards the opening is in each case deemed to be the maximum thickness of the profile over the entire length along the longitudinal direction.

The thickness of the lips widens in such a way that the setting angle assumes a maximum value in a maximum region. The maximum region can extend over the entire region in which the thickness widens in the direction of the opening. In that case, on the underside, between the location of minimum thickness and the location of maximum thickness the lip forms a slope having a uniform setting angle, the value of that setting angle being the maximum value. The maximum region extends, however, especially only over a portion of the region in which the thickness widens. In that case the maximum region could also be referred to as the "region of steepest rise". It is also possible for the extent of the maximum region to approach zero, for example if the setting angle changes continuously in that direction. "Extent" is always to be understood as being the extent along the direction from the connecting side to the opening, that is to say perpendicular to the longitudinal direction of the profile and perpendicular to the connecting side.

The invention proposes that the centre of the maximum region be located closer to the side wall than to the opening. The "centre" relates to the extent of the maximum region. The maximum region can be arranged with its entire extent closer to the side wall, especially if its extent is small. It is also possible, however, for a portion of the maximum region to be located closer to the opening than to the side wall. According to the invention, however, even in that case the centre of the maximum region is located closer to the side wall than to the opening.

The arrangement of the maximum region in accordance with the invention enables a complementarily shaped hammerhead element to find a contact point located well to the outside in the direction of the side walls, and this is especially still the case even if the lip bends outwards slightly under high load. By virtue of the small distance between the contact point and the side wall, the lip of the anchor channel according to the invention has a lesser tendency to failure caused by bending-open than do the lips of the known anchor channels. The combination of anchor channel and hammerhead element according to the invention therefore provides that the hammerhead element is complementary to the rail and is arranged to be brought into engagement therewith in such a way that the hammerhead element in each case makes contact in the centre of the maximum regions of the lips. Preferably the hammerhead element makes contact with the lips over the entire inner side.

In order to make the best possible use of the said effect, the invention proposes that in a preferred embodiment the spacing of the centre of the maximum region from the side wall be a maximum of 90%, especially a maximum of 80%, and preferably a maximum of 60% of the spacing of the centre of the maximum region from the opening. In other words, the centre of the maximum region is preferably significantly closer to the side wall than to the opening.

The maximum value of the setting angle is preferably between 30° and 90°, especially between 45° and 60°; for example it is 50°. This has proved to be advantageous both in respect of the holding forces and in respect of ease of production.

In a preferred embodiment, the thickness of the lip widens in the direction towards the opening also in a region that is located closer to the opening than to the side wall. The widening in that region is such that the setting angle has on average, especially constantly, a value that is at least 10°, especially at least 20°, smaller than the maximum value. Not included in the average value is any possible rounding at the transition to the opening, because in that region the thickness of the lip is no longer widening. In other words, the widening of the thickness extends beyond the centre between side wall and opening in the direction of the opening but is less strongly pronounced at that location. For example, the maximum value of the setting angle is 60°, while the average value of the setting angle in the region that is located closer to the opening than to the side wall is 30°.

Preferably the setting angle in the region that is located closer to the opening than to the side wall has on average a value between 1° and 30°, especially between 10° and 20°. This has again proved to be advantageous both in respect of the holding forces and in respect of ease of production.

In an alternative embodiment of the invention, the thickness of the lip in a region that is located closer to the opening than to the side wall remains substantially the same or decreases in the direction towards the opening.

In a preferred form of this alternative embodiment, in the region that is located closer to the opening than to the side wall the inner side and the outer side have an angle of taper with respect to one another, the value of the angle of taper being between 1° and 30°, especially between 10° and 20°. Preferably the angle of taper is 15°. Here too: in the event of the lip's having toothing, the thickness and accordingly also the angle of taper relate to the envelope contour and, in respect of the outer side, to a notional plane spanning the lip on the outer side.

Preferably the maximum thickness of the lip corresponds to at least 1.6 times, especially at least 1.8 times, the minimum thickness of the side wall. Such a minimum ratio makes it possible to achieve sufficiently large wall thicknesses and sufficiently large values of the setting angle at the lip in order to achieve high holding forces.

In order, on the one hand, to achieve a high degree of stability in terms of the holding forces but, on the other hand, also to leave sufficient space in the interior of the rail for mounting a hammerhead element, the invention proposes that the ratio of the minimum thickness of the lip to the maximum thickness of the lip be between 0.4 and 0.8, especially between 0.55 and 0.75.

The ratio of the projection of the lip relative to the thickness is also of significance to the stability and the space in the interior, "projection" being understood to mean the extent of the lip along the direction from the connecting side to the opening, and more specifically from the side wall as far as the opening. The invention proposes that the maximum thickness of the lip correspond to at least 0.5 times, especially at least 0.6 times, the projection of the lip from the side wall to the opening.

Preferably, the inner side merges from the side walls to the lips in each case with a radius. This should not be too small, in order that no notch effect occurs, and should not be too large, in order that the centre of the maximum region is located as close as possible to the side wall. Preferably the size of the radius is between 0.5 times and 0.8 times, especially between 0.6 times and 0.7 times, the minimum thickness of the side wall.

In order to achieve interlocking engagement between rail and hammerhead element in the longitudinal direction of the rail, the invention proposes that the lip has toothing on the inner side in a region that is located closer to the opening than to the side wall, whereas a region that is located on the side of the maximum region that faces towards the side wall has no toothing. By virtue of the toothing-free portion, the lip is not weakened by toothing in its thinner portion.

The features and combinations of features, configurations and embodiments of the invention mentioned above in the description, as well as the features and combinations of features mentioned below in the description of the Figures and/or shown in a Figure, can be employed not only in the particular combination defined or shown in each case, but also in basically any other combinations or on their own. Configurations of the invention that do not have all features of a dependent claim are possible. It is also possible for individual features of a claim to be replaced by other disclosed features or combinations of features. Configurations of the invention are possible that do not have all features of the exemplary embodiment(s) but have in principle any part of the characterised features of an exemplary embodiment, optionally in combination with one, some or all features of one or more further exemplary embodiments.

BRIEF DESCRIPTION OF THE DRAWINGS

The invention is explained below with reference to three exemplary embodiments. The Figures are substantially to scale.

In the drawings.

DETAILED DESCRIPTION OF THE INVENTION

Figure 1:
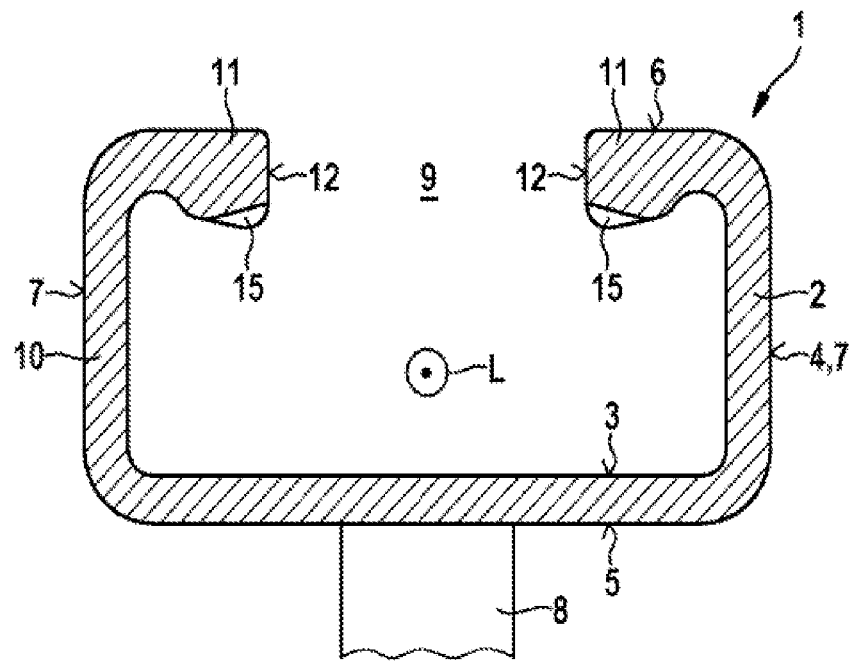
FIG. 1 is a sectional view of a first exemplary embodiment of an anchor channel according to the invention.
Figure 2:
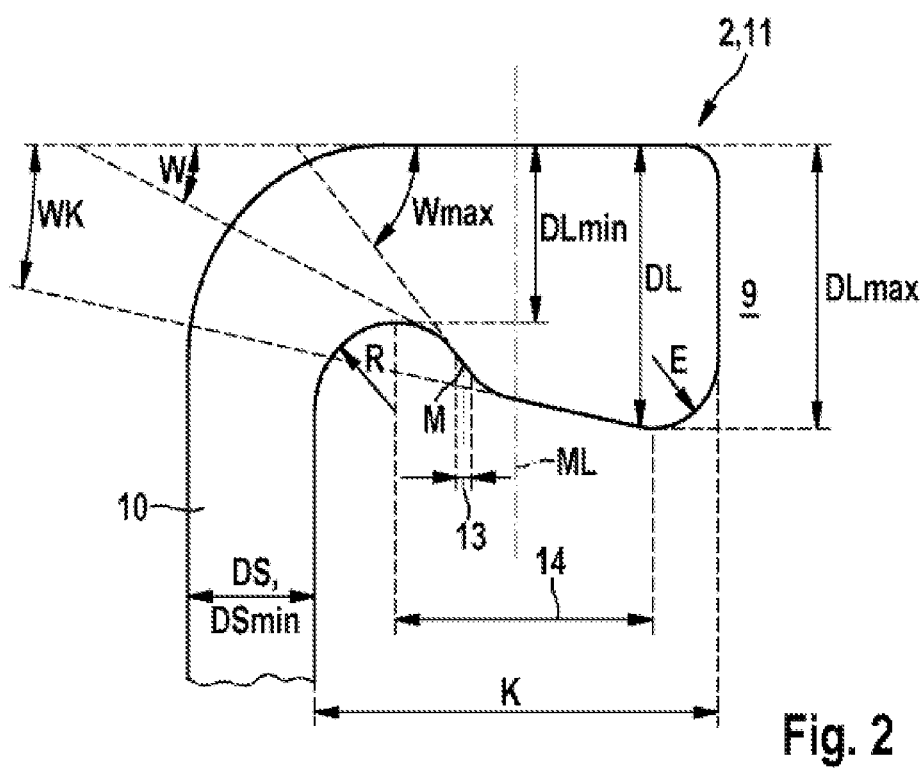
FIG. 2 is an enlarged sectional view of a lip of the same anchor channel.

The exemplary embodiment shown in FIGS. 1 and 2 shows a cross-section through an anchor channel 1 according to the invention. The anchor channel 1 has a rail 2 having a C-shaped profile which extends along a longitudinal direction L, the longitudinal direction L running perpendicular to the plane of the drawing in all Figures. The profile of the rail 2 has an inner side 3 and an outer side 4 as well as a substantially rectangular outline with rounded corners. The outline also has an underside 5 and an upper side 6 located opposite the underside 5, which are connected on both sides by connecting sides 7. The underside and upper side 5, 6 are approximately 1.9 times as long as the connecting sides 7.

On the underside 5 there are arranged a plurality of anchor bolts 8 in the form of head bolts. Since the anchor bolts 8 are arranged one after the other in the longitudinal direction L, only one of the anchor bolts 8 is visible. The anchor bolt 8 is also shown only in part, as it is not important hereinbelow. Along the upper side 6, a slot-like opening 9 of the C-shaped profile for insertion of a hammerhead element (not shown) extends in the longitudinal direction L. The connecting sides 7 are formed by side walls 10. On the upper side 6, lips 11 extend from each of the side walls 10 as far as the opening 9. In the region of the openings 9, the inner side 3 merges into the outer side 4 via end faces 12 of the lips 11.

The thickness DL of the lips 11 in each case increases in the direction towards the opening 9. The thickness DL of the lips 11 therefore does not assume a constant value. As a result, the inner side 3 and the outer side 4 are at a setting angle W with respect to one another, the setting angle W also not assuming a constant value over the extent of the respective lip 11. The "extent" is to be understood as being the extent along the direction from the connecting side 7 to the opening 9. The thickness DL of the lips 11 is in each case to be measured perpendicular to the extent of the respective lip 11.

One of the two lips 11 is described below, the other lip 11 having a mirror-symmetrical shape, as does also the entire anchor channel 1 in the exemplary embodiment. On the inner side 3, the side wall 10 merges into the lip 11 with a radius R. The size of the radius R corresponds to approximately 0.65 times a thickness DS of the side wall 10, the thickness DS of the side wall 10 being constant and accordingly also corresponding to a minimum thickness DSmin of the side wall 10. Starting from the side wall 10, the inner side 3 passes the narrowest point of the lip 11, that is to say the point having a minimum thickness DLmin of the lip 11, with the radius R and then merges into a maximum region 13 in which the setting angle W assumes a maximum value of 50°, that is to say in which a maximum setting angle Wmax is to be found. The extent of the maximum region 13 is small and it is located entirely, that is to say including a centre M of the maximum region 13, closer to the side wall 10 than to the opening 9. The spacing of the centre M of the maximum region 13 from the side wall 10 corresponds to approximately 60% of the spacing of the centre M of the maximum region 13 from the opening 9. FIG. 2 shows a centre line ML of the extent of the lip 11. The centre line ML therefore divides the region that is arranged closer to the side wall 10 than to the opening 9 (on the left in FIG. 2) from the region that is arranged closer to the opening 9 than to the side wall 10 (on the right in FIG. 2). Accordingly, the maximum region 13 is entirely situated to the left of the centre line ML. Starting from the maximum region 13, after a short rounded transition but still to the left of the centre line ML, the inner side 3 continues in the direction of the opening 9 with a value of the setting angle W of 10° and then continues with a further, very short rounded transition into the location at which the lip 11 assumes a maximum thickness DLmax. The maximum thickness DLmax of the lip 11 corresponds to approximately 1.8 times the thickness DS of the side wall 10 and the minimum thickness DLmin corresponds to approximately 0.65 times the maximum thickness DLmax of the lip 11.

In the region that is located closer to the opening 9 than to the side wall 10, the setting angle W therefore has a largely constant value, the setting angle W in that region being identified as the "small setting angle" WK in FIG. 2. As a result of the very short transition to the location of maximum thickness DLmax, the small setting angle WK corresponds to approximately the average value of the setting angle W to the right of the centre line. The concept of the setting angle W is used only for the region in which the thickness D of the lip 11 widens, that is to say in a widening region 14 of the lip 11 which extends from the location of minimum thickness DLmin to the location of maximum thickness DLmax of the lip 11. Starting from the location of maximum thickness DLmax, the inner side merges into the end face 12 of the lip 11 with a corner radius E which corresponds to approximately 0.55 times the thickness DS of the side wall 10. The end faces 12 define a projection K of the lip 11 from the side wall 10 to the opening 9, which can also be thought of as the "extent of the lip 11".

In the region to the right of the centre line ML, the inner side 3, but not the end face 12 of the lip 11, has toothing 15 in the longitudinal direction L of the rail 2. For a better overview the toothing 15 is not shown in FIG. 2. The toothing 15 does not extend as far as a region that is located closer to the side wall 10 than to the opening 9, that is to say does not extend to the left of the centre line ML. Therefore no toothing is arranged in a region which is located on the side of the maximum region 13 that faces towards the side wall 10. The afore-described thickness D relates to the envelope contour of the toothing 15, that is to say to the tooth tips and not, for example, to the contour in the tooth base.

The rail 2 is formed from a flat sheet metal strip in a multi-stage roll-forming process (not shown). The lips 11 are especially thickened by lateral rollers which act on the end faces of the sheet metal strip.

Figure 3:
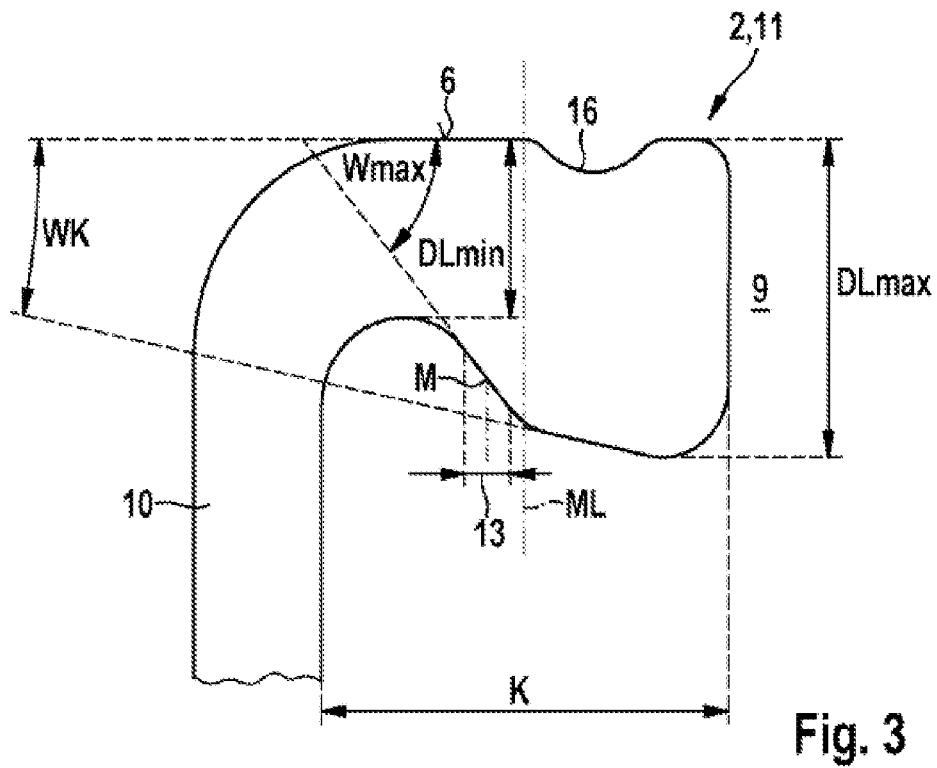
FIG. 3 is an enlarged sectional view of a lip of an anchor channel of a second exemplary embodiment.
Figure 4:
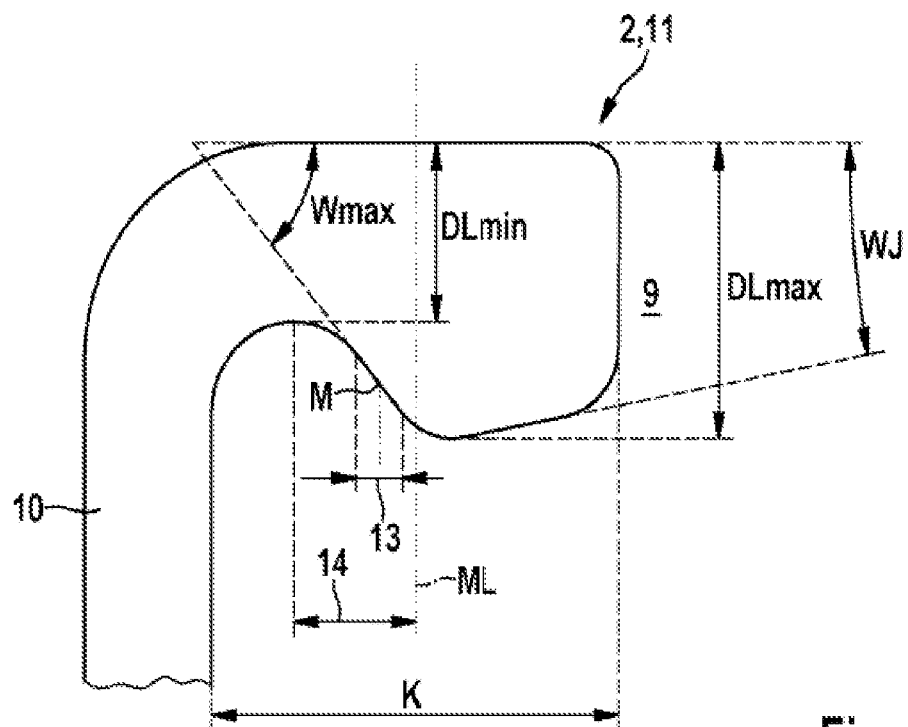
FIG. 4 is an enlarged sectional view of a lip of an anchor channel of a third exemplary embodiment.

FIGS. 3 and 4 show the lip 11 of a second and a third exemplary embodiment, respectively. The views are limited to the lip 11, since the anchor channel 1 is otherwise the same as in the first exemplary embodiment. The lips 11 especially all have the same projection K. Accordingly, to avoid repetitions only the differences with respect to the first exemplary embodiment will be discussed hereinbelow.

In the second exemplary embodiment shown in FIG. 3 the maximum setting angle Wmax is 45° and the small setting angle WK is 22°. At the same time the maximum region 13 almost borders on the centre line ML. Since the maximum region 13 has a slightly larger extent, the centre M of the maximum region 13 is approximately the same distance from the side wall 10 as in the first exemplary embodiment. Although the maximum setting angle Wmax is slightly shallower than in the first exemplary embodiment, the larger small setting angle WK results in a larger maximum thickness DLmax of the lip 11. The ratio of the minimum thickness DLmin to the maximum thickness DLmax of the lip 11 is approximately 0.5 and the maximum thickness DLmax of the lip 11 corresponds to approximately 2.0 times the thickness DS of the side wall 10.

On the upper side 6, the lip 11 has a groove 16 extending in the longitudinal direction L. For the determination of the thickness DL of the lip 11 as well as for the determination of the setting angle W, however, that groove 16 is disregarded; that is to say, reference is made to a notional plane which spans the upper side 6 of the lip 11.

In the third exemplary embodiment shown in FIG. 4 the maximum setting angle Wmax is 50°. The widening region 14 extends, however, only to approximately the centre line ML at which the lip 11 has its maximum thickness DLmax. To the right of the centre line ML the thickness DL of the lip 11 decreases towards the opening 9 and in the drawing encloses an angle of taper WJ of 10°, although a slightly larger angle of taper WJ of 15° is preferred.

Figure 5:
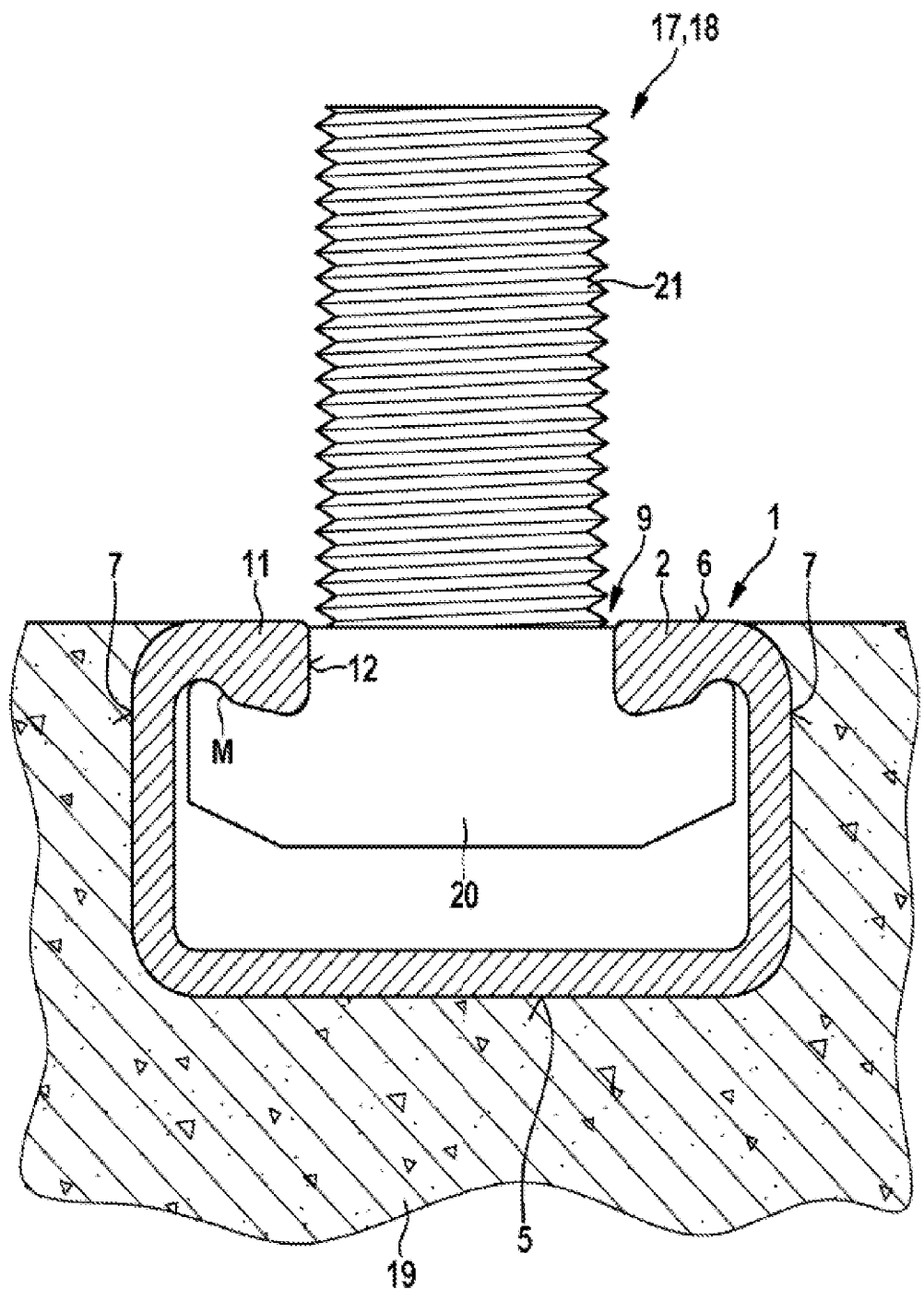
FIG. 5 shows the anchor channel of the first exemplary embodiment in the concreted-in state and in combination with a hammerhead screw.

FIG. 5 again shows the first exemplary embodiment, but in the concreted-in state and in combination with a hammerhead screw 17 as hammerhead element 18. To achieve this state the anchor channel 1 was nailed to the inner side of a formwork (not shown), the upper side 6 having been in contact with the formwork. In the interior of the rail 2, a foam inlay prevented concrete from penetrating into the rail. The two ends of the rail 2 have also been closed by a cover cap made of plastics (not shown). The formwork was filled with concrete and removed once the concrete had hardened. The concrete forms a fastening substrate 19 which surrounds the anchor channel 1 on its connecting sides 7 and on the underside 5 as well as around the anchor bolt 8 (not shown in FIG. 5). The upper side 6 is accessible, however. The foam inlay was removed. For fastening an article (not shown), for example a sub-structure for a facade, the hammerhead screw 17 has been inserted into the rail through the opening 9. For that purpose a hammerhead 20 of the hammerhead screw 17 was aligned along the opening 9, that is to say in the longitudinal direction L of the rail 2. The hammerhead 17 was then rotated through 90° into the position shown. For a better overview only a thread 21 of the hammerhead screw 17 is shown. By means of a nut and a washer, an element to be fastened can be attached via the thread 21 (not shown). The tightening of the nut has the effect that the hammerhead 20 is drawn against the inner side 3 of the rail 2 in the region of the lip 11. On its side 11 that faces towards the lip 11, the hammerhead 20 has geometry corresponding to the lip 11, so that it makes contact with the lips 11 on the entire inner side 3 and also on the end face 12 of the lip 11. In particular, the hammerhead 20 makes contact with the centre M of the maximum region 13.

Should especially high tensile forces act on the hammerhead screw 17 in a direction away from the fastening substrate 19, the lips 11 could bend open slightly in that direction. This would result in the lips 11 lifting away from the hammerhead 20 in the region close to the opening 9, but contact in the region of the centre M of the maximum region 13 would be maintained. From there the forces can be transmitted into the remainder of the profile of the rail 2 so that the hold of the hammerhead screw 17 is ensured even in the event of very high forces.

LIST OF REFERENCE SYMBOLS

Anchor Channel and Combination of Anchor Channel and Hammerhead Element
  1 anchor channel
  2 rail
  3 inner side
  4 outer side
  5 underside
  6 upper side
  7 connecting side
  8 anchor bolt
  9 opening
  10 side wall
  11 lip
  12 end face of the lip 11
  13 maximum region
  14 widening region
  15 toothing
  16 groove
  17 hammerhead screw
  18 hammerhead element
  19 fastening substrate
  20 hammerhead
  21 thread
  DL thickness of the lip 11
  DLmax maximum thickness of the lip 11
  DLmin minimum thickness of the lip 11
  DS thickness of the side wall 10
  DSmin minimum thickness of the side wall 10
  E corner radius
  K projection
  L longitudinal direction of the rail 2
  M centre of the maximum region 13
  ML centre line of the extent of the lip 11
  W setting angle
  WJ angle of taper
  WK small setting angle
  Wmax maximum setting angle
  R radius

The invention claimed is:
1. A combination of an anchor channel and a hammerhead element,
  the anchor channel comprising:
    a rail which has a cross-section having a substantially constant, C-shaped profile which extends along a longitudinal direction, the profile having an inner side and an outer side as well as an outline having an underside, having an upper side, which is located opposite the underside, and having two connecting sides which connect the upper side and the underside, wherein on the upper side an opening of the C-shaped profile extends in a longitudinal direction, wherein on the underside of the rail there are arranged especially at least two anchor bolts, wherein the connecting sides are formed by side walls of the rail, wherein, on the upper side, lips extend from each of the side walls as far as the opening, and wherein the thickness of the lip in each case widens in the direction towards the opening in such a way that the inner side and the outer side are at a setting angle with respect to one another, wherein the setting angle varies from a minimum value closer to the side wall to a maximum value closer to the opening, and the setting angle assumes the maximum value in a maximum region, wherein the inner side has a portion with a radius of curvature R that merges with the lip at the maximum region at a point at which the lip has a minimum thickness, and the inner side has a rounded transition from the maximum region toward a direction of maximum thickness of the lip;

wherein a center of the maximum region is located closer to the side wall than to the opening, and wherein the hammerhead element is complementary to the rail and is arranged to be brought into engagement therewith in such a way that the hammerhead element in each case makes contact in the center of the maximum regions of the lips.

2. The combination according to claim 1, wherein as to the anchor channel the spacing of the center of the maximum region from the side wall is a maximum of 90% of the spacing of the center of the maximum region from the opening.

3. The combination according to claim 1, wherein as to the anchor channel the maximum value of the setting angle is between 30° and 90°.

4. The combination according to claim 3, wherein as to the anchor channel the thickness of the lip widens in the direction towards the opening in a region that is located closer to the opening than to the side wall in such a way that the setting angle has on average a value that is at least 10° smaller than the maximum value.

5. The combination according to claim 4, wherein as to the anchor channel the value of the setting angle is between 1° and 30°.

6. The combination according to claim 1, wherein as to the anchor channel the thickness of the lip in a region that is located closer to the opening than to the side wall remains substantially the same or decreases in the direction towards the opening.

7. The combination according to claim 6, wherein as to the anchor channel in the region that is located closer to the opening than to the side wall the inner side and the outer side have an angle of taper with respect to one another; and the value of the angle of taper is between 1° and 30°.

8. The combination according to claim 1, wherein as to the anchor channel a maximum thickness of the lip corresponds to at least 1.6 times a minimum thickness of the side wall.

9. The combination according to claim 1, wherein as to the anchor channel the ratio of a minimum thickness of the lip to a maximum thickness of the lip is between 0.4 and 0.8.

10. The combination according to claim 1, wherein as to the anchor channel a maximum thickness of the lip corresponds to at least 0.5 times the projection of the lip from the side wall to the opening.

11. The combination according to claim 1, wherein as to the anchor channel the inner side merges from the side walls to the lips in each case with a radius, the size of which corresponds to between 0.5 times and 0.8 times a minimum thickness of the side wall.

12. The combination according to claim 1, wherein as to the anchor channel the lip has toothing on the inner side in a region that is located closer to the opening than to the side wall and has no toothing in a region that is located on the side of the maximum region that faces towards the side wall.

13. The combination according to claim 1, wherein the hammerhead element is complementary to the rail and is arranged to be brought into engagement therewith in such a way that the hammerhead element in each case makes contact with the lips over the entire inner side.

\* \* \* \* \*